United States Patent
Hehl

(10) Patent No.: US 6,953,334 B2
(45) Date of Patent: Oct. 11, 2005

(54) CLOSING DEVICE ON A PLASTIC INJECTION MOLDING MACHINE

(76) Inventor: Karl Hehl, Arthur-Hehl-Strasse 32, D-72290 Lossburg (DE)

( * ) Notice: Subject to any disclaimer, the term of this patent is extended or adjusted under 35 U.S.C. 154(b) by 328 days.

(21) Appl. No.: 10/399,125

(22) PCT Filed: Oct. 13, 2001

(86) PCT No.: PCT/EP01/11854
§ 371 (c)(1),
(2), (4) Date: Apr. 16, 2003

(87) PCT Pub. No.: WO02/32638
PCT Pub. Date: Apr. 25, 2002

(65) Prior Publication Data
US 2004/0037916 A1 Feb. 26, 2004

(30) Foreign Application Priority Data
Oct. 16, 2000 (DE) ......................................... 100 51 255

(51) Int. Cl.[7] ............................................. B29C 45/67
(52) U.S. Cl. ..................................... 425/590; 425/451.2
(58) Field of Search ................................. 425/589, 590, 425/595, 451.2

(56) References Cited

U.S. PATENT DOCUMENTS

| | | | | |
|---|---|---|---|---|
| 4,380,427 A | * | 4/1983 | Hehl | ........................ 425/590 |
| 4,846,664 A | | 7/1989 | Hehl | |
| 4,861,259 A | * | 8/1989 | Takada | ...................... 425/590 |
| 4,865,537 A | * | 9/1989 | Shima | ........................ 425/590 |
| 4,981,426 A | * | 1/1991 | Aoki | ........................... 425/590 |
| 5,052,910 A | | 10/1991 | Hehl | |
| 5,129,806 A | | 7/1992 | Hehl | |

FOREIGN PATENT DOCUMENTS

| | | |
|---|---|---|
| DE | 3644181 | 4/1988 |
| DE | 3844432 | 1/1990 |
| DE | 4018334 | 11/1991 |
| DE | 19809666 | 9/1999 |
| DE | 19820934 | 11/1999 |
| EP | 0281329 | 9/1988 |
| EP | 0281330 | 9/1988 |
| EP | 0342235 | 11/1989 |
| GB | 1182456 | 2/1970 |

* cited by examiner

Primary Examiner—James P. Mackey
(74) Attorney, Agent, or Firm—Cantor Colburn LLP

(57) ABSTRACT

A closing device for a mold closing unit includes: at least one hydraulic pressure cylinder unit for generating a mold closing pressure on an injection mold which is accommodated in a mold clamping chamber; a pressure piston disposed in the pressure cylinder unit, a piston rod of the pressure piston is disposed along a central axis of the pressure cylinder unit, and the pressure piston separates a high-pressure chamber of the pressure cylinder unit from a low-pressure chamber thereof; an hydraulic driver cylinder, associated with the pressure cylinder unit, for closing the injection mold assembly, which drive cylinder is disposed concentrically relative to the central axis, and an actual cylinder of the drive cylinder is formed by the pressure piston of the pressure cylinder unit; and an hydraulic compensating cylinder, associated with the pressure cylinder unit, for receiving or respectively dispensing hydraulic medium, which comes from the pressure cylinder unit or respectively is to be dispensed to said pressure cylinder unit, and including a compensating cylinder chamber being in open communication with the low-pressure chamber of the pressure cylinder unit, wherein the compensating cylinder is likewise disposed concentrically relative to the central axis.

11 Claims, 5 Drawing Sheets

CLOSING DEVICE ON A PLASTIC INJECTION MOLDING MACHINE

CROSS-REFERENCE TO RELATED APPLICATIONS

The present application claims the priority of German Patent Application 100 51 255.0, filed on Oct. 16, 2000, the disclosed contents of which are hereby also expressly made the subject-matter of the present application.

FIELD OF THE INVENTION

The invention relates to a closing device on the mold dosing unit of a plastic injection molding machine for processing plastics materials and other plasticizable substances.

BACKGROUND OF THE INVENTION

Such a closing device is known from DE 36 44 181 C1. In a pressure cylinder, which is disposed symmetrically relative to an axis of symmetry of the mold closing device, a drive cylinder is disposed in the piston of the pressure cylinder. The pressure piston of the pressure cylinder is displaceable jointly with the movable mold carrier. Likewise, the piston rod of the drive cylinder is disposed in a stationary manner. Two compensating cylinders are disposed diametrically relative to the pressure cylinder and are in open communication with the low-pressure chamber of the pressure cylinder. During the closing movement, hydraulic medium is transferred from the compensating cylinders and from the low-pressure chamber to the high-pressure chamber, which then applies the force for keeping the mold closed. In the case of such an embodiment, however, the volume of the compensating cylinders is limited and, in order to ensure a symmetrical force introduction, an appropriate amount of precision work is necessary.

To apply greater forces, a closing device is known from DE 38 44 432 C1, wherein at least two pressure cylinders are disposed symmetrically relative to the central axis. Furthermore, the drive cylinder is disposed centrally and lies in the compensating cylinder. In practical usage with delicate injection molded parts, however, it has in fact become apparent that, despite the symmetrical disposition of the pressure cylinders, irregularities in the build-up of the pressure for keeping the mold closed may occur in certain circumstances, above all after an appropriate service-life of the machine, such irregularities affecting the precision of the injection molded parts.

In the case of a closing device known from EP 0 281 329 A2, a drive cylinder is disposed in the pressure piston of a central pressure cylinder. Volume, expelled by the pressure piston, is transferred to a compensating cylinder, whereby pressure piston and piston of the compensating cylinder are guided jointly on the movable mold carrier. However, the compensating cylinder is situated beneath the pressure cylinder and, in this respect, is disposed in an asymmetrical manner. Although the compensating cylinder is a passive cylinder, it is apparent that the asymmetrical arrangement leads to an irregular application of force with the above-mentioned disadvantages.

It is known, from EP 0 281 330 A2, to stack drive cylinder and pressure cylinder one inside the other, but to provide no compensating cylinder, though any expelled hydraulic medium is to be guided over the tank of the machine. This leads to a regular, considerable exchange of hydraulic medium, on the one hand, and this also increases the pressure build-up times, on the other hand.

SUMMARY OF THE INVENTION

The above discussed and other drawbacks and deficiencies of the prior art are overcome or alleviated by a closing device. The closing device for an injection molding machine has a space-saving construction, and meets the demands which are to be made regarding the precision during the production of injection molded parts.

The closing device for a mold closing unit includes: at least one hydraulic pressure cylinder unit for generating a mold closing pressure on an injection mold which is accommodated in a mold clamping chamber; a pressure piston disposed in the pressure cylinder unit, a piston rod of the pressure piston is disposed along a central axis of the pressure cylinder unit, and the pressure piston separates a high-pressure chamber of the pressure cylinder unit from a low-pressure chamber thereof; an hydraulic drive cylinder, associated with the pressure cylinder unit, for closing the injection mold assembly, which drive cylinder is disposed concentrically relative to the central axis, and an actual cylinder of the drive cylinder is formed by the pressure piston of the pressure cylinder unit; and an hydraulic compensating cylinder, associated with the pressure cylinder unit, for receiving or respectively dispensing hydraulic medium, which comes from the pressure cylinder unit or respectively is to be dispensed to said pressure cylinder unit, and including a compensating cylinder chamber being in open communication with the low-pressure chamber of the pressure cylinder unit, wherein the compensating cylinder is likewise disposed concentrically relative to the central axis.

The closing device is so constructed that the cylinders of the closing device are stacked one inside the other. All of the cylinders are disposed concentrically relative to a central axis, so that a force is introduced concentrically relative to this central axis. In consequence, there is no longer an asymmetrical introduction of force within the closing device, so that a greater level of precision for the injection molding machine is ensured. At the same time, the volume of hydraulic medium required to build-up the pressure for keeping the mold closed is easily available, since it is expelled during the movement from the compensating cylinder chamber and low-pressure chamber to the high-pressure chamber. In consequence, rapid pressure build-up times are possible.

A space-saving construction results from one embodiment, since the appropriate overflow ducts are directly provided in the respective pistons of the compensating cylinder and pressure cylinder unit so that additional hydraulic pipes, which would have an adverse effect on the pressure build-up times, can be eliminated.

BRIEF DESCRIPTION OF THE FIGURES

The invention is explained more fully hereinafter with reference to one embodiment. In the drawings.

DETAILED DESCRIPTION

The invention is now explained more detailed by way of example with reference to the accompanying drawings. However, the embodiments are only examples which should not restrict the inventive concept to one specific disposition.

Figure 1:
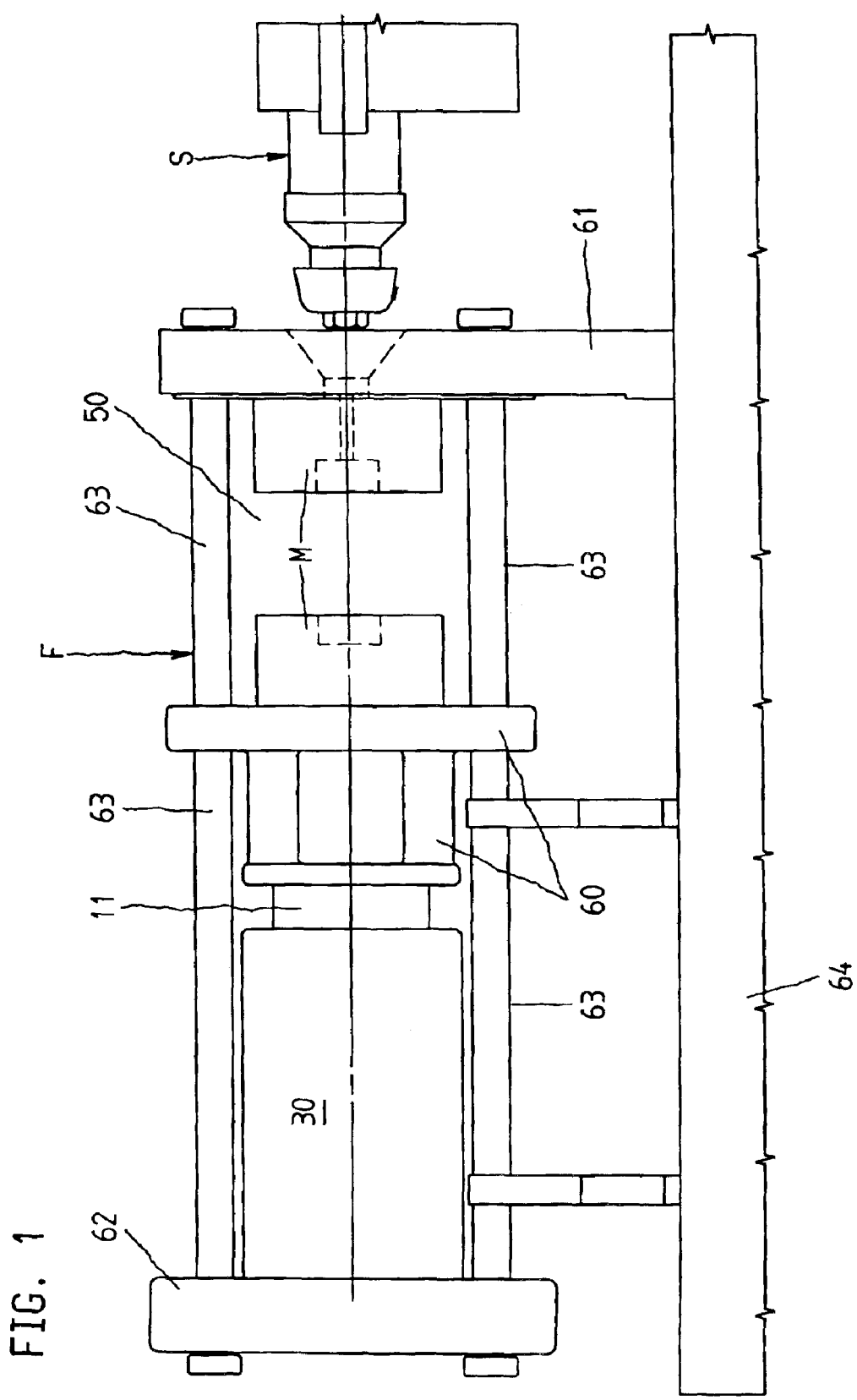
FIG. 1 is a side elevational view of a portion of an injection molding machine having a mold closing unit disposed on a machine base and provided with an associated injection molding unit.

FIG. 1 illustrates the closing device for a mold dosing unit F of a plastic injection molding machine for processing plastics materials and other plasticizable substances, such as, for example, pulverulent substances or ceramic substances. The mold closing unit F is supported on a machine base 64 and includes a stationary mold carrier 61, a movable mold carrier 60, and a supporting element 62. The closing device is supported on the supporting element 62, of which device FIG. 1 illustrates the externally situated compensating cylinder 30 and the pressure cylinder 11, which serves as the piston for this compensating cylinder. During actuation of the pressure cylinder unit, which is to be discussed more fully hereinafter, the movable mold carrier 60 is displaced, whereby it is guided along the guide bars or guide columns 63. An injection mold assembly M is accommodated in the mold clamping chamber 50 and is cyclically opened and closed as a consequence of the movement of the closing device. In the closed state, material which has been plasticised by the injection molding unit S is injected into the mold cavity of the injection mold assembly M via an opening in the stationary mold carrier 61. In this respect, FIG. 1 illustrates the conventional construction of a mold closing unit for a plastic injection molding machine. However, other constructions are also possible for the mold closing unit. Thus, for example, in the case of a construction along the lines of DE 36 44 181 C1, the mold closing unit could protrude rearwardly beyond the supporting element and extend through said unit in a direction towards the movable mold carrier.

Figure 2:
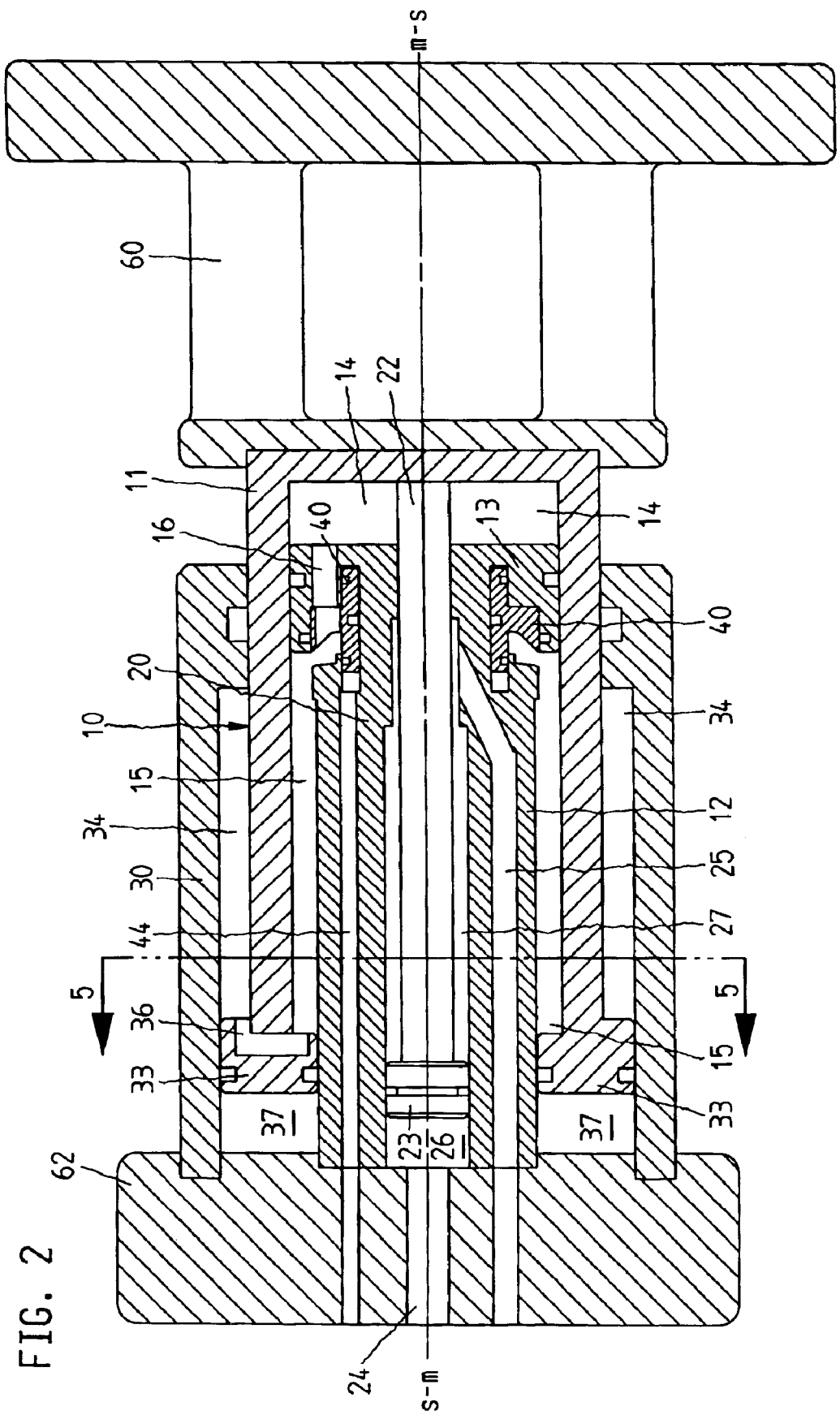
FIGS. 2, 3 are enlarged longitudinal sectional views through the closing device of FIG. 1, showing the mold in its opened and closed positions.
Figure 3:
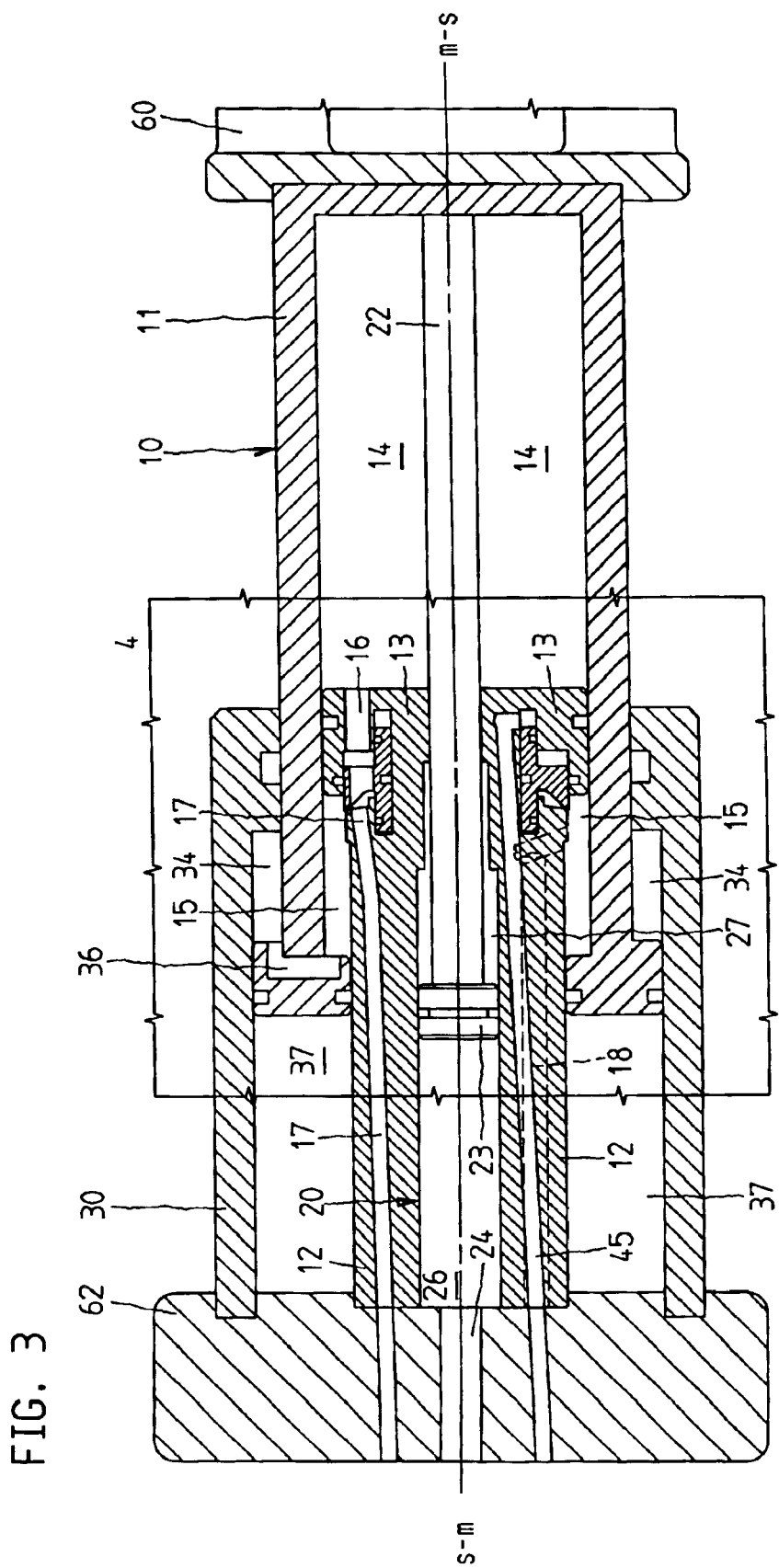

According to FIGS. 2 and 3, the closing device has at least one hydraulic pressure cylinder unit 10 for building-up the pressure, for keeping the mold closed, on the injection mold assembly M in the closed state thereof. This corresponds to a position of the dosing device shown in FIG. 3. In the embodiment, only one single pressure cylinder unit 10 is illustrated, the central axis m—m of which is both the central axis and the axis of symmetry s—s respectively of the mold closing unit. This has the advantage of an optimum symmetrical introduction of force on the movable mold carrier 60 and, hence, on the injection mold assembly M. However, since the cylinders are totally surrounded circumferentially, the required volumes can be made available in a space-saving manner. Basically, however, a plurality of appropriately constructed closing devices may also be disposed parallel to one another, provided that a correspondingly uniform build-up of pressure is ensured in the individual pressure cylinder units.

A pressure piston 13 is provided in the pressure cylinder unit 10, the piston rod 12 of which piston is disposed along the central axis m—m of the pressure cylinder unit 10. According to FIGS. 2 and 3, this pressure piston 13 separates the high-pressure chamber 14 of the pressure cylinder unit from the low-pressure chamber 15. Above all, after the mold has been closed, the pressure for keeping the mold closed is built-up internally of the cylinder 11 in the high-pressure chamber 14 according to FIG. 3 via the pressure cylinder unit 10. The opening and closing of the injection mold assembly—whereby the substances of the closing device have to be moved substantially so that a low pressure is sufficient therefor—are effected via an hydraulic drive cylinder 20 associated with the pressure cylinder unit 10. The drive cylinder 20 is disposed concentrically relative to the central axis m—m, its actual cylinder being formed by the piston rod 12 of the pressure cylinder unit 10. In other words, the drive cylinder 20 lies concentrically in the pressure cylinder unit 10.

To close the mold, hydraulic medium is supplied to the cylinder chamber 26 via an hydraulic pipe in the form of the bore 24 and, to open the mold, hydraulic medium is transferred to the cylinder chamber 27 via an hydraulic pipe, which is disposed in the piston rod 12 of the pressure cylinder unit and is in the form of the bore 25. So as not to pump the hydraulic medium, which is expelled from the high-pressure chamber 14 by the pressure piston during the opening of the injection mold assembly M, during each injection molding cycle into the tank and subsequently from there into the high-pressure chamber again, an hydraulic compensating cylinder 30, associated with the pressure cylinder unit 10, is provided to receive or respectively dispense hydraulic medium which comes from the pressure cylinder unit 10 or respectively is to be dispensed to said unit. The compensating cylinder chamber 34 is in open communication with the low-pressure chamber 15 of the pressure cylinder unit 10.

Figure 5:
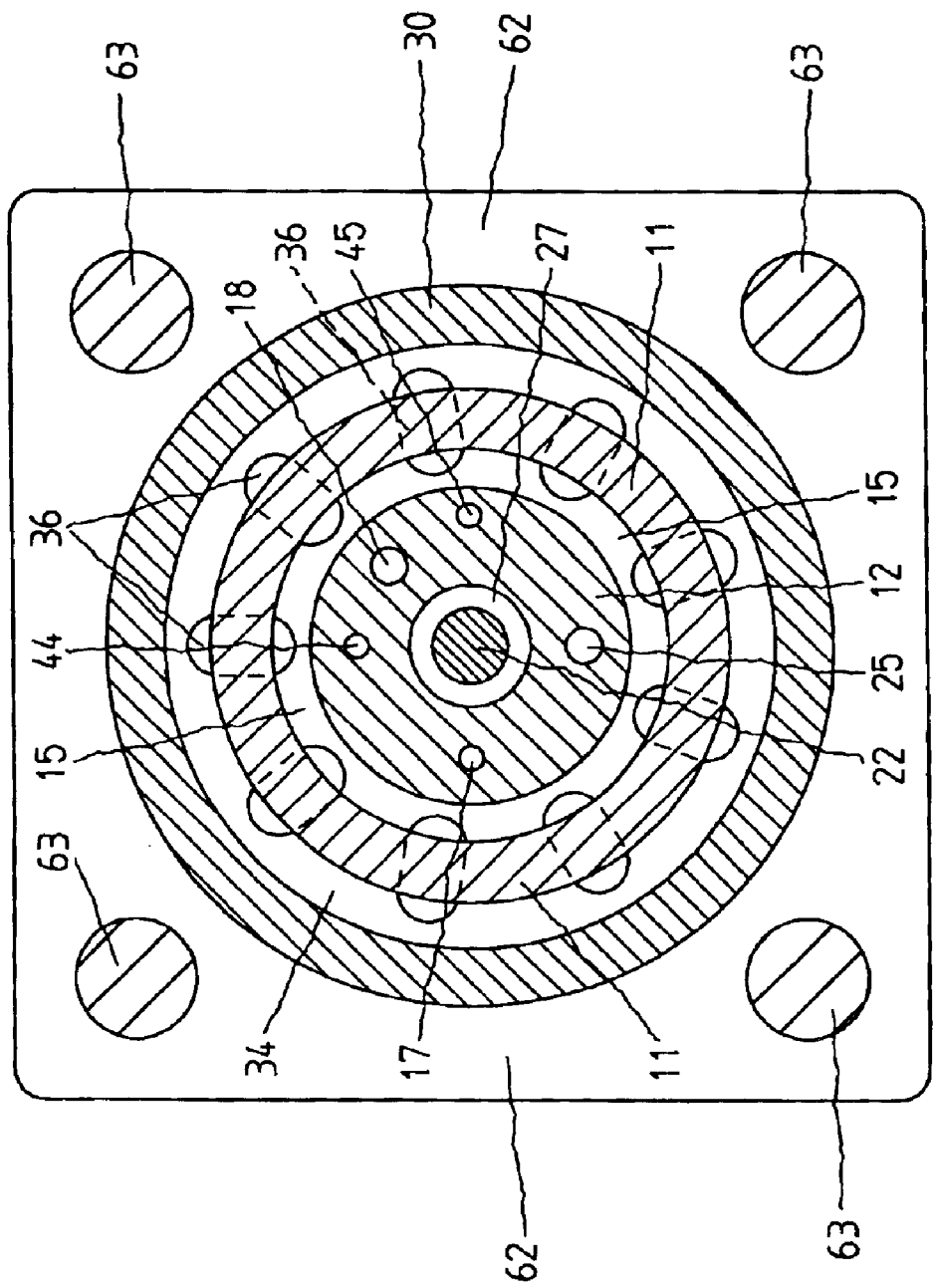
FIG. 5 is a sectional view taken along the line 5—5 of FIG. 2.

According to FIG. 5, in conjunction with FIGS. 2 and 3, the compensating cylinder 30 is likewise disposed concentrically relative to the central axis m—m. In consequence, all of the cylinders are stacked one inside the other and disposed concentrically relative to the central axis m—m. This leads to a symmetrical construction, so that the volume of the compensating cylinder, which is only actually passive, cannot even have an adverse effect on the precision of the injection molding machine.

This disposition leads to the actual piston rod of the compensating cylinder 30 being formed by the cylinder 11 of the pressure cylinder unit 10, that is to say in a similar manner it fulfills a double function like the piston rod 12 of the pressure cylinder unit 10 with regard to the drive cylinder 20. In the embodiment, the pressure piston 13 and the piston rod 12 as well as the compensating cylinder 30 are stationary, i.e. they are connected to the supporting element 62. The cylinder 11 of the pressure cylinder unit 10 and, hence, the piston of the compensating cylinder as well as the piston rod 22 with the piston 23 of the drive cylinder are, however, connected to the movable mold carrier, and this leads to a corresponding reduction in the substances to be displaced. However, a reversal is possible.

The hydraulic medium is conveyed between the individual cylinder chambers via overflow ducts. Thus, an overflow duct 36 is situated in the piston 33 of the compensating cylinder 30 in order to establish the open connection between the compensating cylinder chamber 34 and the low-pressure chamber 15 of the pressure cylinder unit 10. According to FIG. 5, this overflow duct is formed by various bores in the piston 33, so that the hydraulic medium can be rapidly transferred from the compensating cylinder chamber 34 to the low-pressure chamber 15 without any problems from the point of view of flow technology. An additional overflow duct 16 is provided in the pressure piston 13 of the pressure cylinder unit 10, but said duct can be shut-off via a valve in order to permit, if necessary, the separation between the low-pressure chamber 15 and the high-pressure chamber 14. An annular piston 40 is provided as the hydraulically actuatable valve, said piston being displaceable to a limited extent on the piston rod 12 or respectively in the pressure piston 13 of the pressure cylinder unit 10. If the overflow duct 16 is opened, hydraulic medium is initially conveyed into the cylinder chamber 26 via the bore 24 during the closure of the mold, that is to say during a transfer of the closing device from a position shown in FIG. 2 to a position shown in FIG. 3. As a consequence of the displacement caused thereby, hydraulic medium is initially expelled from the hydraulic chamber 27 of the drive cylinder 20 via an hydraulic pipe in the form of the bore 25. However, since the cylinder 11 in FIG. 2 is moved to the right by this movement, hydraulic medium is expelled from the compensating cylinder chamber 34 via the overflow duct 36 to the low-pressure chamber 15 and from there via the overflow duct 16 to the high-pressure chamber 14. Since hydraulic medium can only act on one side of the piston 33 of the compensating cylinder 30, atmospheric pressure is situated in the chamber 37. At the same time, a space-saving construction is produced, since the corresponding overflow ducts are provided directly in the respective pistons of the compensating cylinder 30 and pressure cylinder unit 10, so that additional hydraulic pipes, which would adversely affect the pressure build-up times, can be eliminated.

The volumes of the compensating cylinder chamber 34 and of the low-pressure chamber 15 shown in FIG. 2 correspond roughly to the volume of the high-pressure chamber 14 in the closed position of the injection mold assembly M shown in FIG. 3. In such case, however, it is ensured that at least one minimal exchange of oil takes place during each cycle in order to ensure that the hydraulic medium is cleaned and cooled.

Figure 4:
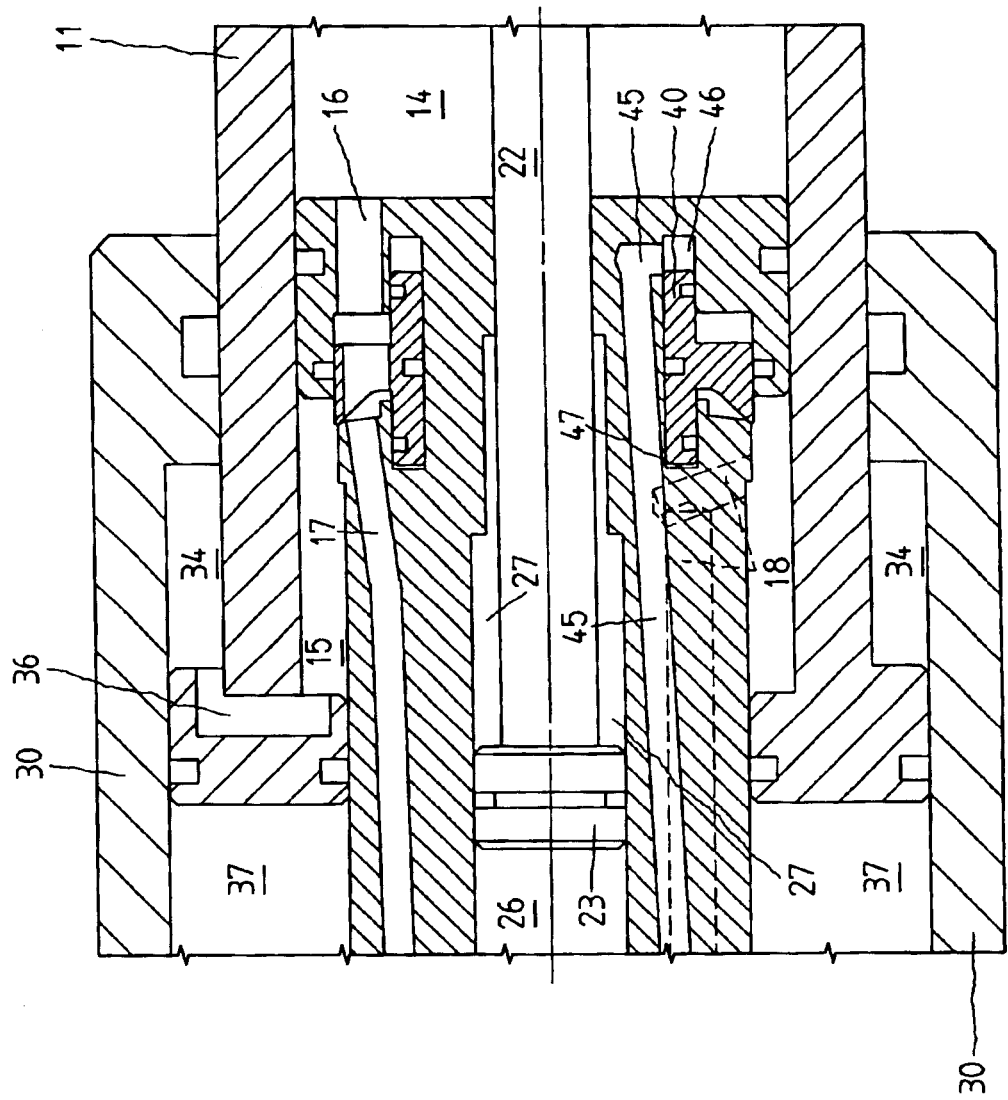
FIG. 4 is an enlarged sectional view taken from the central region of FIG. 3.

If the closing device is in the position shown in FIG. 3, the pressure for keeping the mold closed has to be built-up in the high-pressure chamber 14. For such purpose, the annular piston 40, which is provided as the valve, is initially closed via an hydraulic pipe in the form of the bore 45. The pressure for keeping the mold closed is subsequently built-up via an hydraulic pipe in the form of the bore 17 and, in the embodiment, the annular piston 40, that is to say the valve itself, is traversed. If the injection molding process is terminated, pressure is initially reduced again via the bore 17. The annular piston 40 is then reset via an hydraulic pipe in the form of the bore 44 and via the cylinder chamber 47 with the expulsion of the hydraulic medium in the cylinder chamber 46, so that the pressure in the high-pressure chamber is reduced. Basically, the injection mold assembly can now be opened again by hydraulic medium being supplied via the bore 25 to the hydraulic chamber 27. If this pressure is not sufficient to open the mold, a high-pressure opening can additionally be effected via the bore 18, which is shown by dashed lines in FIGS. 3 and 4, and via which bore hydraulic medium can be additionally transferred to the low-pressure chamber 15 when the annular piston 40 is closed (FIGS. 3, 4).

It is self-evident that this description can be subjected to the most varied modifications, changes and adaptations which fall within the range of equivalents to the dependent claims.

What is claimed is:

1. Closing device for a mold closing unit of a plastic injection molding machine for processing plastics materials and other plasticizable substances, said device comprising:

at least one hydraulic pressure cylinder unit for generating a mold closing pressure on an injection mold which is accommodated in a mold clamping chamber;

a pressure piston disposed in the pressure cylinder unit, a piston rod of the pressure piston is disposed along a central axis of the pressure cylinder unit, and the pressure piston separates a high-pressure chamber of the pressure cylinder unit from a low-pressure chamber;

an hydraulic drive cylinder associated with the pressure cylinder unit for closing the injection mold assembly, which drive cylinder is disposed concentrically relative to the central axis, and an actual cylinder of the drive cylinder is formed by the pressure piston of the pressure cylinder unit; and an hydraulic compensating cylinder associated with the pressure cylinder unit for receiving or respectively dispensing hydraulic medium, which comes from the pressure cylinder unit or respectively is to be dispensed to said pressure cylinder unit, and comprising a compensating cylinder chamber being in open communication with the low-pressure chamber of the pressure cylinder unit, wherein the compensating cylinder is likewise disposed concentrically relative to the central axis.

2. Closing device according to claim 1, wherein an actual piston rod of the compensating cylinder is formed by the cylinder of the pressure cylinder unit.

3. Closing device according to claim 1, wherein the pressure piston and the piston rod of the pressure cylinder unit are stationary.

4. Closing device according to claim 1, wherein the cylinder of the pressure cylinder unit is connected to a movable mold carrier for common displacement.

5. Closing device according to claim 1, wherein a piston of the compensating cylinder has an overflow duct for open connection between the compensating cylinder chamber and the low-pressure chamber of the pressure cylinder unit.

6. Closing device according to claim 1, wherein the compensating cylinder surrounds the pressure cylinder unit.

7. Closing device according to claim 1, wherein an additional overflow duct between the low-pressure chamber and the high-pressure chamber is provided in the pressure piston of the pressure cylinder unit, which duct can be shut-off via a valve.

8. Closing device according to claim 7, wherein the valve is hydraulically actuatable valve and is formed by an annular piston, which is displaceable to a limited extent on the piston rod and in the pressure piston of the pressure cylinder unit.

9. Closing device according to claim 1, wherein the low-pressure chamber and the compensating cylinder chamber are actuatable upon with pressure via an hydraulic pipe.

10. Closing device according to claim 1, wherein the central axis of the pressure cylinder unit is both the central axis and axis of symmetry respectively of the mold closing unit.

11. Closing device according to claim 5, wherein the piston of the compensating cylinder is acted upon with hydraulic medium on one side.

* * * * *